United States Patent
Maeda

(10) Patent No.: US 6,748,291 B2
(45) Date of Patent: Jun. 8, 2004

(54) NC MACHINE TOOL AND INFORMATION TRANSMISSION SYSTEM

(75) Inventor: Kingo Maeda, Yamatokoriyama (JP)

(73) Assignee: Mori Seiki Co., LTD, Yamatokoriyama (JP)

(*) Notice: Subject to any disclaimer, the term of this patent is extended or adjusted under 35 U.S.C. 154(b) by 0 days.

(21) Appl. No.: 10/460,387

(22) Filed: Jun. 13, 2003

(65) Prior Publication Data

US 2003/0233164 A1 Dec. 18, 2003

(30) Foreign Application Priority Data

Jun. 14, 2002 (JP) ......................................... 2002-174206
Jun. 14, 2002 (JP) ......................................... 2002-174324

(51) Int. Cl.[7] .......................... G06F 19/00; G05B 11/01
(52) U.S. Cl. ......................... 700/175; 700/86; 700/108; 700/174; 700/180
(58) Field of Search ......................... 700/86, 108, 174, 700/180, 181, 182, 183, 159

(56) References Cited

U.S. PATENT DOCUMENTS

| | | | | |
|---|---|---|---|---|
| 4,882,670 | A | * 11/1989 | Isobe et al. | .................. 700/83 |
| 6,397,111 | B1 | * 5/2002 | Niwa | ........................ 700/11 |
| 6,542,937 | B1 | * 4/2003 | Kask et al. | ................ 709/328 |
| 2002/0013639 | A1 | * 1/2002 | Fujishima et al. | ........ 700/175 |
| 2002/0183889 | A1 | * 12/2002 | Sakakibara | ................ 700/180 |
| 2003/0014387 | A1 | * 1/2003 | Kreidler et al. | ................ 707/1 |
| 2003/0023336 | A1 | * 1/2003 | Kreidler et al. | ............. 700/108 |
| 2003/0033048 | A1 | * 2/2003 | Nakamura et al. | .......... 700/182 |
| 2003/0125827 | A1 | * 7/2003 | Arai et al. | .................. 700/180 |

FOREIGN PATENT DOCUMENTS

| JP | 2001-265420 | 9/2001 |
|---|---|---|
| JP | 2002-63240 | 2/2002 |

* cited by examiner

*Primary Examiner*—Leo Picard
*Assistant Examiner*—Douglas S. Lee
(74) *Attorney, Agent, or Firm*—Westerman, Hattori, Daniels & Adrian, LLP

(57) ABSTRACT

An information transmission system according to the present invention is constructed by connecting a transmission device which transmits information to an NC machine tool 20 via a network 2. The NC machine tool 20 comprises an operating panel 25 including an operation key 22, a keyboard 23, and a screen display section 24, and a control device 29 consisting of an input/output control section 40 which has a display control section 42. The display control section 42 receives information transmitted from the transmission device via the network 2, and display the same on the screen display section 24. Since the received information is automatically displayed on the screen display section 24 of the operating panel 25 being frequently looked at while an operator operates the NC machine tool 20, and that makes it possible to certainly give information to be given to the operator quickly and efficiently.

14 Claims, 8 Drawing Sheets

FIG. 8

| MEM | *** | *** | *** | 0 (mm/min) | | O0001 | N00001 |
|---|---|---|---|---|---|---|---|
| | | | | 0 (%) | 0 (min-1) | 15:19:02 | HEAD1 |

Program check

```
> O0001 ;
:
G0 G40 ;
M9 ;
N10 (CENTER. DRILL, 3.000, T6 H6) ;
M5 ;
T6 ;
G91 G28 Z0 M19 ;
M1 ;
M6 ;
N11 ;
T7 ;
G90 G54 G17 G0 X0 Y0 ;
G43 Z50. H6 S1380 M3 ;
Z50. M8 ;
```

| | Absolute coordinate | Remaining movement amount |
|---|---|---|
| X1 | 300.000 | 0.000 |
| Z1 | 300.000 | 0.000 |
| C1 | 000.000 | 0.000 |
| Y1 | 000.000 | 0.000 |
| B1 | 000.000 | 0.000 |

| The number of machining parts | 74/ 33 |
|---|---|
| Operation time | 0041H 05M 59S |
| Cycle time | 0000H 00M 00.0S |

| F | Actual F | 0 | |
|---|---|---|---|
| S | Actual S | 0 | min-1 |
| T | | | |
| M | | | |

Modal G

| G01 | G97 | G69 | G99 | G40 |
| G25 | G22 | G80 | G67 | G54 |
| G64 | | G69.1 | G50.2 | G13.1 |

| List 0 search | Check | BG edit | | N search | Program rewind | Parts : 0 | Operation : 0 |

NC MACHINE TOOL AND INFORMATION TRANSMISSION SYSTEM

BACKGROUND OF THE INVENTION

1. Field of the Invention

The present invention relates to an NC machine tool of an information transmission system which is configured to connect a control device of said NC machine tool to a transmission device which transmits information, such as an instructing message and a machining program or the like via telecommunication circuits, and the information transmission system.

2. Description of the Prior Art

Generally, in a production site where various products are machined, machining is performed according to a production instruction based on an overall production planning. The production instruction includes contents, such as a product number of a product which should be machined, its machining schedule (scheduled machining start date and time and scheduled machining completion date and time), and the quantity of products to be machined, is usually communicated to each operator via a production instruction document prepared for every machine tool and printed on a paper medium, and is ensured for thoroughness through meetings or the like.

Moreover, in said meetings, operations which the operators should perform are also instructed and the operators perform the operations according to the contents of instruction.

By way of example, when a delay in procurement of materials arises, or when an order of product of short time limit for delivery is received, it becomes necessary to change said production planning, consequently, if the production planning is changed, naturally, it is also necessary to change the production instruction based on a new production planning.

In this case, when the change arises before each operator is informed of the production instruction or when there is enough time even after having informed of the production instruction, so serious problem may not occur, in case of an emergency, however, it is necessary that those who direct the production instruction should go to each operator's work area to inform each operator directly of the changes in the production instruction, or even to ask operators to stop the machine tools under operation and summon them so that they may be informed of these changes. A similar thing may also be said with regards to the above-mentioned operation instructions.

Thus, in a conventional manner of instruction content communication, when changing the instruction contents, there has been a problem regarding the communication of these changes in a quick and efficient way. For this reason, for example, when there is a change in the quantity of products to be machined, a number of products will be uselessly machined, or when there is a change in kind of products, unnecessary products are machined or set-up operations become useless, thereby a drop-off in productive efficiency is caused.

Moreover, an NC machine tool comprises a machining motion mechanism, such as a main spindle unit and a feed mechanism or the like which are a motion mechanism for machining a work piece, and a numerical control device which numerically controls operation of this machining motion mechanism, and such numerical control is performed based on a machining program generated depending on machined products.

This machining program is usually generated by a programmer well versed in this using a manual program generation device and an automatic programming device. Then, the generated machining program is usually carried in a condition that it is suitably stored in a recording medium, then read from the recording medium by the numerical control device of storing object, and then stored in the numerical control device.

On the other hand, in recent years, connecting said manual program generation device and said automatic programming device to the numerical control device of the NC machine tool via network, such as LAN, and transmitting the generated machining program to each numerical control device via the network and storing the same have also been performed.

By the way, when an approach of storing the machining program in the numerical control device after storing the same in the recording medium once is employed, and since the operators of the NC machine tools perform the operations for storing the machining program in the recording medium into the numerical control device, it is expected that this operator grasps in detail the actual condition and what kind of machining program is stored in the numerical control device of the NC machine tool which the operator is in charge.

On the other hand, when an approach of transmitting and storing the machining program in each numerical control device via the network is employed, since the operator does not perform storing operations, such situation where a new machining program is stored (addition of the machining program) or a suitably modified machining program is stored in the form of overwriting on the already stored machining program (change of the machining program) may happen when the operator does not become aware thereof.

However, when the addition or the change in the machining program are made in the place where the operator may not know it like this, this may cause confusion among operators on the information, whether or not, a trial machining has already been completed regarding the machining program stored in the numerical control device, in other words, the operator can not make clear whether the trial machining has already been completed or not, sometimes, such a situation where the operator misunderstands that the trial machining has already been completed with regard to the added or changed machining program and has resulted in continuous machining using the machining program occurs. In this case, if there is the error in the machining program, a serious accident may be happen such as, a tool and a work piece may come into collision.

The present invention is made in view of the above actual situation, the object thereof is to provide an NC machine tool and an information transmission system which will enable the transmission of a production instruction, an operation instruction or the like quickly and efficiently to an operator who operates a machine tool, and further, will certainly enable the operator to recognize a machining program to be stored when storing the machining program in a control device of the NC machine tool via telecommunication circuits.

SUMMARY OF THE INVENTION

The present invention in order to achieve the above-mentioned objective relates to an NC machine tool of an information transmission system configured to connect the NC machine tool, comprising: a machining motion mechanism; a control device which controls operation of this machining motion mechanism; and an operating panel including at least input means for inputting a signal to said control device, and screen display means to a transmission device which transmits information via telecommunication circuits, and the information transmission system.

Said control device is configured so that it can be connected to the transmission device which transmits the information via the telecommunication circuits, and is configured so as to receive the information from said transmission device, and display received information on said screen display means.

By way of example, the information to be transmitted are: instructing messages, such as production instruction messages, i.e., kind, quantity, machining schedule of products that should be machined, operation instruction messages, i.e., a set-up of machining, and a note in machining or the like; and a machining program.

Then, when transmit information is the instructing message, the instructing message is received by the control device and this is displayed on the screen display means. Moreover, when the transmit information is the machining program, a program number is extracted from the machining program, and the extracted program number is displayed on the screen display means.

Thus, when the operator confirms the instructing message and the program number displayed in this way, the operator then performs operations according to the confirmed instructing message, or recognizes the machining program automatically transmitted to and stored in the control device of the NC machine tool from the transmission device, and also recognizes addition or change of the machining program which has been stored in the control device.

In this way, if it is configured in a way so that the instructing message and the program number may be automatically displayed on the screen display means of the operating panel, at which the operator frequently looks, during the operation of the NC machine tool, instruction contents to be given can certainly be given to the operator quickly and efficiently, and in addition, the operator can be made to certainly recognize the addition and the change on the machining program stored in the control device.

Incidentally, the program number is usually set to the machining program for every machining program for identification, and this program number is indicated with a cord which consists of, for example, "O****" (alphabet O and four digits following thereto). Accordingly, the program number mentioned above can be extracted by searching the cord containing "O" in the machining program.

Moreover, the control device may be configured to display the information so that all or a part of an image already displayed on the screen display means are covered with said information when displaying the same. Although an image, such as an operating state (for example, main spindle rotating speed of a main spindle unit, current position of a feed mechanism or the like) of said machining motion mechanism, is usually displayed on the screen display means, by covering all or a part of the existing display image with an image concerning the received information, namely, by displaying to overlap the existing display image therewith as described above, it becomes easier for the operator to confirm the displayed information, and the instructing message can be accurately communicated to the operator, or the operator can be made to recognize more certainly the machining program stored in the control device.

Moreover, by displaying to overlap the existing display image, it becomes impossible for the operator to recognize the image having been displayed until then, and it becomes impossible for the operator to perform operations while looking at a screen display until the displayed image concerning the received information disappears. Therefore, for example, it becomes impossible for the operator to perform operations to read the machining program of the products in order to machine products before modification even though the production instruction has been modified by transmitting the instructing message, and that makes it possible to prevent, beforehand, wrong products from being machined. Moreover, it becomes impossible to perform an editing operation of the machining program during transmission of the machining program, for example, when a machining program already stored in the control device is replaced with a machining program which has been modified therefrom by the transmission process, that makes it possible to prevent such a situation where the operator calls the replaced machining program to perform continuous machining using the machining program which has not completed trial machining yet, while not fully grasping the addition and the change of the machining program.

It is preferable to delete the displayed information when confirmation that the operator has recognized this can be obtained, for this reason, it is recommended to configure it so that a confirmation signal for confirming that the operator has recognized the displayed information can be inputted from said input means, and to configure the control device so that said control device may receive the inputted confirmation signal to complete the display of the received information.

Furthermore, said control device may be configured so that all or a part of other signals inputted from said input means may be made to be invalid after displaying said received information on said screen display means until receiving the confirmation signal inputted from said input means.

As mentioned above, it is possible to prevent the operator from performing the operations while looking at the screen display if all or a part of the existing display image are displayed so as to be covered with an instructing message image, however, unless otherwise being covered, as described above, for example, it may happen that even though the production instruction has been modified by transmitting the instructing message, the operator calls the machining program of the product to machine the wrong products in order to machine the products before modification, and in addition, since the editing operation of the machining program is available during transmission, the operator calls the machining program changed by the transmission process to perform the continuous machining using the machining program which has not completed the trial machining without fully grasping the addition and the change of the machining program.

Therefore, if all or a part of the other signals inputted from said input means are made to become invalid between an input of the confirmation signal and deletion of the received information as described above, a readout of a new machining program can be made impossible, or the editing operation of the machining program can be made not to be performed, and that makes it possible to prevent the occurrence of the problem mentioned above.

Moreover, said control device may be configured so that the image for indicating an under-reception is displayed on said screen display means while receiving said information.

Although a period of time for the control device to receive the machining program is a relatively short period of time, it may still happen that the operator performs the editing operation on the existing machining program stored in the control device during the reception. For this reason, when the existing machining program is replaced with the machining program which has been modified therefrom by the transmission process, a situation where the machining program which must have been replaced is further replaced with the machining program which the operator has edited may arise, that makes it impossible for the side which transmits the machining program (management side) to accurately manage the machining program stored in the control device of each NC machine tool.

Therefore, as described above, if it is configured so as to display that is under reception on the screen while the control device is receiving the machining program, the operator can be made to recognize this and this can prevent the occurrence of the problem mentioned above.

Incidentally, the indication that it is under reception can be performed, for example, by blinking a part of an image which is displayed on the screen display means, or by displaying the message that it is under reception on the screen display means.

In addition, said telecommunication circuits according to the present invention includes various communication circuits for configuring network, such as LAN, VAN, and leased telephone circuits and optical communication circuits.

BRIEF DESCRIPTION OF THE DRAWINGS

FIGS. 8 and 9 are explanatory drawings illustrating one example of a screen displayed on a screen display section in accordance with another embodiment.

DESCRIPTION OF THE PREFERRED EMBODIMENT

Hereafter, the preferred embodiment of the present invention is described based on accompanying drawings.

First, a message transmission system in accordance with a first embodiment of the present invention is described based on FIGS. 1–4.

Figure 1:
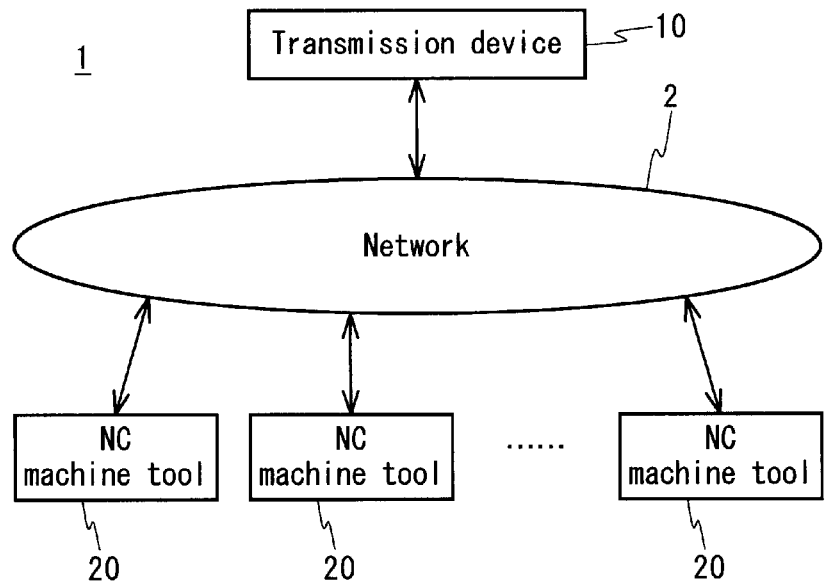
FIG. 1 is a block diagram illustrating an outline configuration of a message transmission system in accordance with a first embodiment of the present invention.
Figure 2:
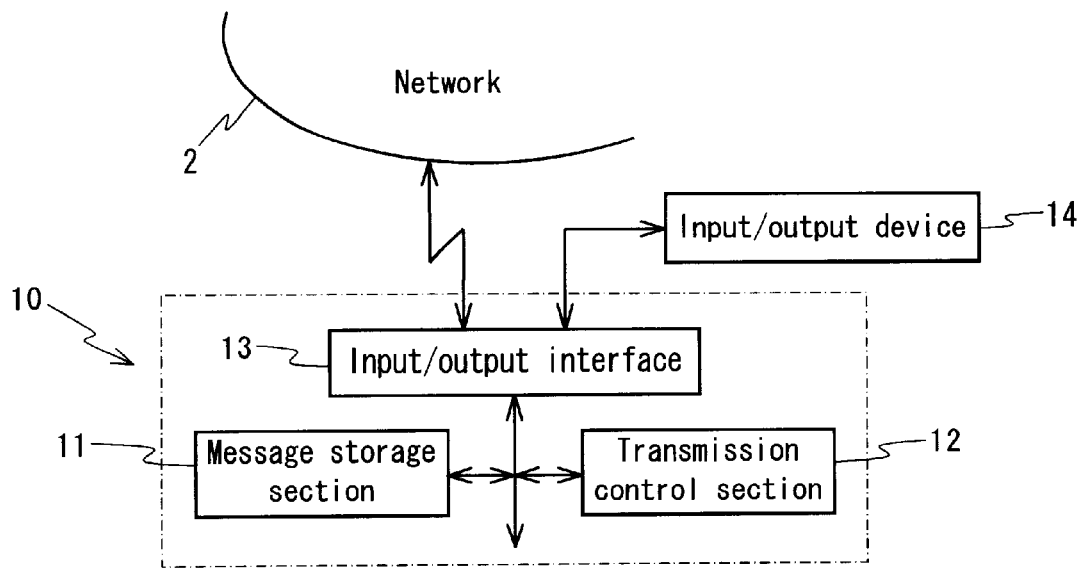
FIG. 2 is a block diagram illustrating an outline configuration of a transmission device in accordance with the present embodiment.
Figure 3:
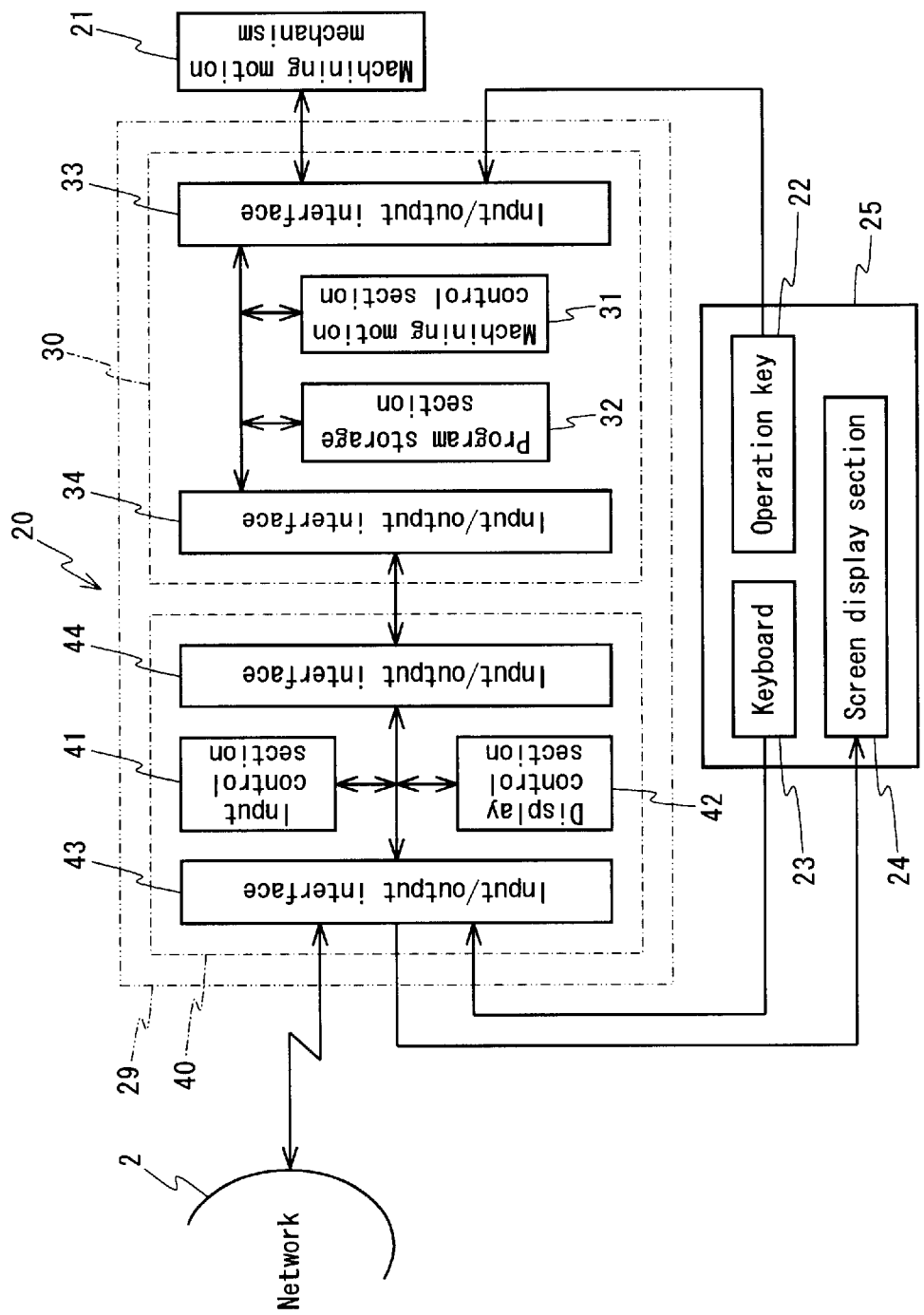
FIG. 3 is a block diagram illustrating an outline configuration of a control device in accordance with the present embodiment.
Figure 4:
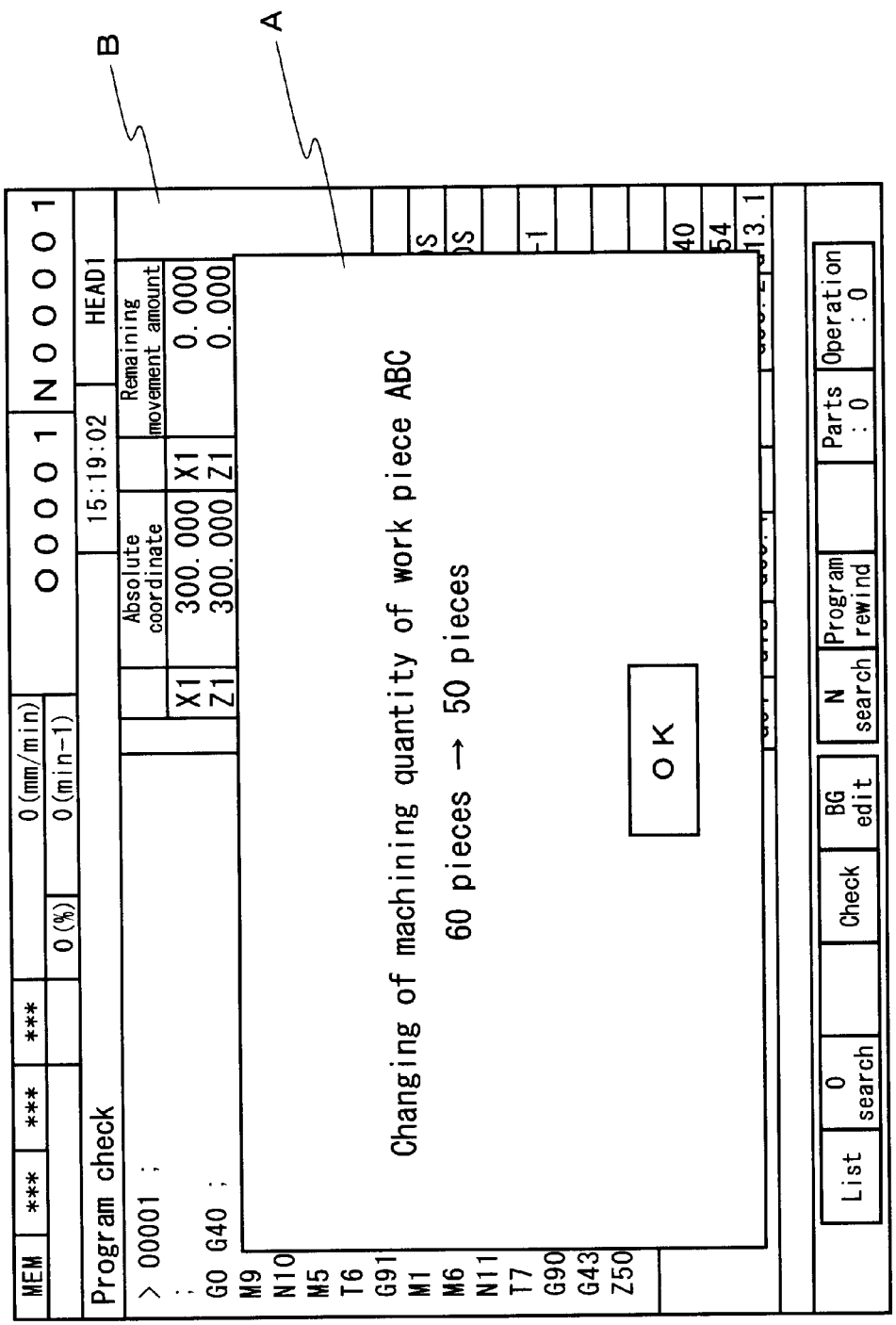
FIG. 4 is an explanatory drawing illustrating one example of a screen displayed on a screen display section in accordance with the present embodiment.

FIG. 1 is a block diagram illustrating an outline configuration of a message transmission system in accordance with the present embodiment, and FIG. 2 is a block diagram illustrating an outline configuration of a transmission device in accordance with the present embodiment. In addition, FIG. 3 is a block diagram illustrating an outline configuration of a control device in accordance with the present embodiment, and FIG. 4 is an explanatory drawing illustrating one example of a screen displayed on a screen display section in accordance with the present embodiment;

As illustrated in FIG. 1, a message transmission system 1 of this example is configured so that a transmission device 10 arranged in a management side (management office or the like) may be connected to a plurality of NC machine tools 20 arranged in a machining site via a network 2, such as LAN.

As illustrated in FIG. 2, said transmission device 10 comprises a message storage section 11, a transmission control section 12, and an input/output interface 13 which comprise a CPU, a ROM, a RAM, an external storage device or the like, and an input/output device 14 connected to the input/output interface 13 or the like, and is connected to said network 2 via the input/output interface 13.

An instructing message inputted via the input/output device 14 is stored in said message storage section 11. Incidentally, as the instructing message, for example, a production instruction message, such as a kind, a quantity, and a machining schedule of products which should be machined, and an operation instruction message, such as a set-up of machining and a note in machining can be named.

Said transmission control section 12 transmits the instructing message stored in the message storage section 11 to said NC machine tool 20 via said input/output interface 13 and said network 2.

As illustrated in FIG. 3, said NC machine tool 20 comprises a machining motion mechanism 21 which comprises a main spindle unit, a feed mechanism or the like, an operating panel 25 which comprises an operation key 22, a keyboard 23, a screen display section 24 or the like, and a control device 29 connected to these machining motion mechanism 21, operating panel 25 or the like.

Said operation key 22 is a key for operating the NC machine tool 20 (for example, said machining motion mechanism 21), and said keyboard 23 is a key for inputting various data and signals. Moreover, said screen display section 24 consists of an LCD or a CRT.

Said control device 29 comprises a numerical control section 30, and an input/output control section 40 which comprise a CPU, a ROM, a RAM, an external storage device or the like, and these numerical control section 30 and input/output control section 40 are mutually connected.

Said numerical control section 30 comprises a machining motion control section 31, a program storage section 32, input/output interfaces 33, 34 or the like, and said machining motion mechanism 21 and said operation key 22 are connected to the input/output interface 33.

A machining program inputted beforehand via a suitable input device which is not shown is stored in said program storage section 32, and said machining motion control section 31 controls operation of said machining motion mechanism 21 based on the machining program stored in this program storage section 32.

Said input/output control section 40 comprises an input control section 41, a display control section 42, input/output interfaces 43, 44 or the like, and is connected to said network 2 via this input/output interface 43. Moreover, said keyboard 23 and said screen display section 24 are connected to the input/output interface 43, and the numerical control section 30 and the input/output control section 40 are mutually connected via said input/output interface 44 and said input/output interface 34.

Said display control section 42 is a functional section which controls a screen display of said screen display section 24, and for example, receives data and a signal which are transmitted from the input control section 41 to display an image (for example, a program number "O**" inputted at the time of a call of the machining program or a program code inputted on the occasion of MDI operation) according to the data and the signal which are received, or, receives an operating state of the machining motion mechanism 21 (for example, a main spindle rotating speed of said main spindle unit, a current position of the feed mechanism or the like), or information, such as the machining program or the like under execution from said numerical control section 30** to display the same.

Moreover, the display control section 42 receives the instructing message transmitted from the transmission control section 12 of said transmission device 10 via said network 2 and said input/output interface 43, displays the image concerning the received instructing message on the screen display section 24 of said operating panel 25, and also transmits a message reception signal which indicates that the instructing message has received to said input control section 41.

Incidentally, an image of the instructing message displayed on said screen display section 24 is displayed so as to cover a part of the image already displayed on the screen display section 24 (for example, a display image, such as the operating state of the machining motion mechanism 21 and the machining program under execution), namely to overlap the existing display image. In addition, the image of this instructing message has a configuration for urging to input a confirmation signal for obtaining a confirmation that the operator of the machine tool 20 has recognized the instructing message from said keyboard 23 or the like, and the display control section 42 deletes the display of the instructing message image after receiving the confirmation signal in a manner described hereafter. The display screen as one example thereof is shown in FIG. 4. Incidentally, in FIG. 4, A portion is the image of the instructing message and B portion is the image already displayed.

Said input control section 41 receives the data and the signal which are inputted from the keyboard 23 via the input/output interface 43, and transmits the received data and signal to said display control section 42 and said numerical control section 30 via the input/output interfaces 44, 34.

In addition, the input control section 41 performs a process which makes the signal inputted from the keyboard 23 invalid, that is, a process which stops transferring the input signal to the display control section 42 and the numerical control section 30, when receiving the message reception signal from said display control section 42. On the other hand, as described above, when the confirmation signal is inputted by the operator, a process which releases said invalid process and makes a signal inputted from the keyboard 23 valid, that is, a process which resumes transferring the input signal to the display control section 42 and the numerical control section 30, and also transmits the confirmation signal to said display control section 42 is performed.

According to the message transmission system 1 of the present embodiment configured as mentioned above, the instructing message is transmitted to the display control section 42 of the NC machine tool 20 from the transmission device 10 via the network 2, and when this is received by the display control section 42, the image concerning the instructing message is displayed to overlap the existing display image on the screen display section 24, and the message reception signal is also transmitted from the display control section 42 to the input control section 41.

Then, the signal inputted from the keyboard 23 becomes invalid, when the message reception signal is received by the input control section 41, and when the confirmation signal for confirming the instructing message is inputted by the operator, the signal inputted from the keyboard 23 becomes effective again. Moreover, by inputting said confirmation signal, the image of the instructing message displayed on the screen display section 24 is deleted.

Thus, according to this message transmission system 1, since the instructing message is automatically displayed on the screen display section 24 of the operating panel 25 being frequently looked at while the operator operates the NC machine tool 20, instruction contents to be given can certainly be given to the operator quickly and efficiently.

Moreover, since the instructing message image is displayed so as to overlap the image already displayed on the screen display section 24, the operator can easily confirm the displayed instructing message and that makes it possible to communicate the instructing message to the operator quickly.

Moreover, by displaying to overlap the existing display images, it becomes impossible for the operator to recognize the images displayed till then, and it becomes impossible for the operator to perform the operation while looking at the screen display until the image of the instructing message disappears, and furthermore, since the input from the keyboard 23 becomes invalid until the confirmation signal of the instructing message is inputted, it becomes impossible for the operator to perform the operation using the keyboard 23. Therefore, for example, even though the production instruction has been modified by transmitting the instructing message, the operator can not take an action to readout the machining program of the product to machine the products before the modification, and that makes it possible to prevent beforehand the wrong products from being machined.

Since the instructing message is made to be continuously displayed until the confirmation signal is inputted by the operator, the instructing message can certainly be given to the operator.

Incidentally, in the present embodiment, although it is configured so that the signal inputted from the keyboard 23 may be made invalid until the confirmation signal is inputted by the operator, but not limited to this, it may also be configured so that an input signal from the operation key 22 may be made invalid, a signal inputted from input means different from these may be made invalid, or an input signal from all or a suitable combination of the input means may be made invalid.

Moreover, although it is configured so that the image concerning the instructing message may be displayed to cover a part of the existing display image, it may also be configured so that a whole existing display image may be hidden, that is, it may be displayed on the full screen.

Next, a machining program transmission system in accordance with another embodiment of the present invention is described based on FIGS. 5–10.

Figure 5:
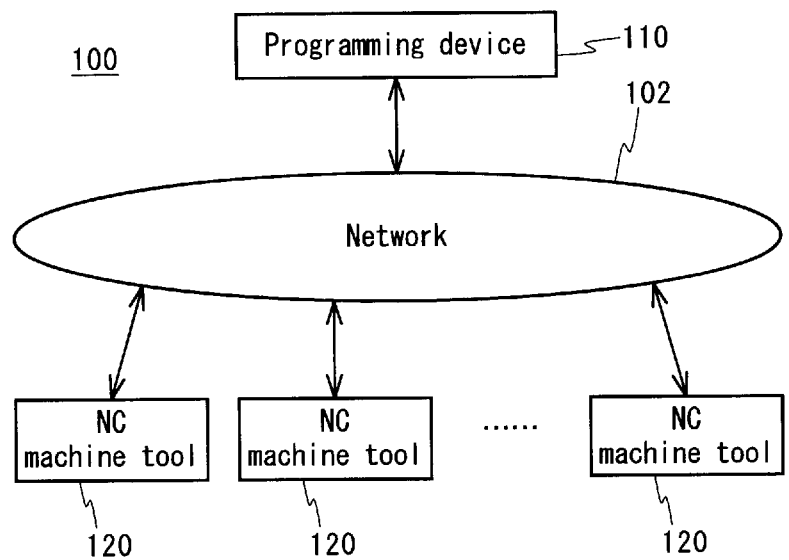
FIG. 5 is a block diagram illustrating an outline configuration of a machining program transmission system in accordance with other embodiment of the present invention.
Figure 6:
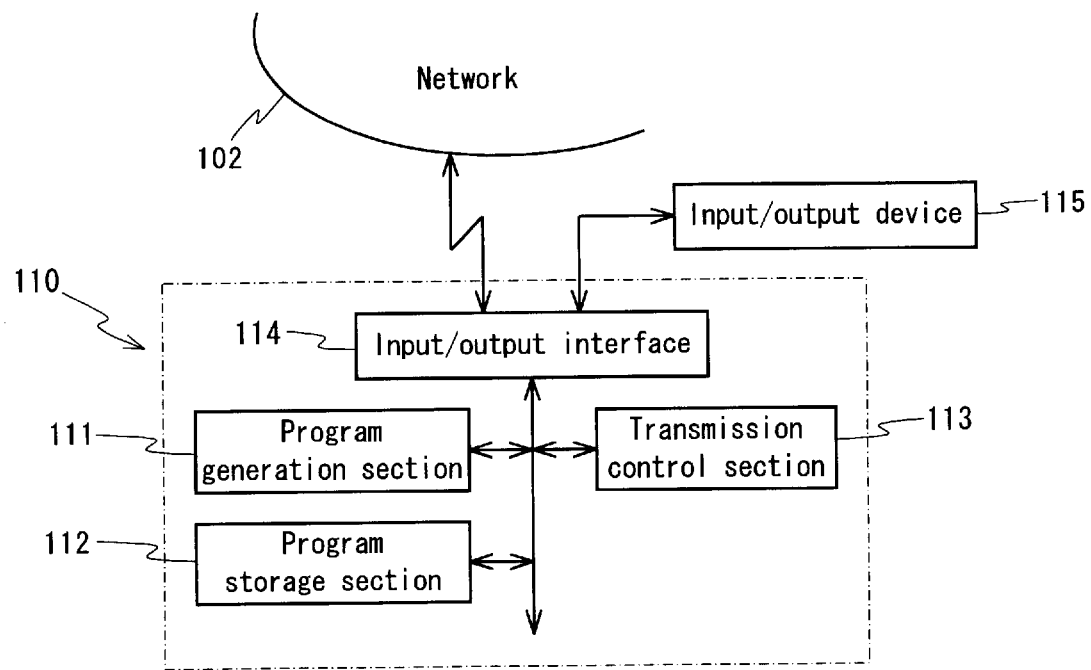
FIG. 6 is a block diagram illustrating an outline configuration of a programming device in accordance with another embodiment.
Figure 7:
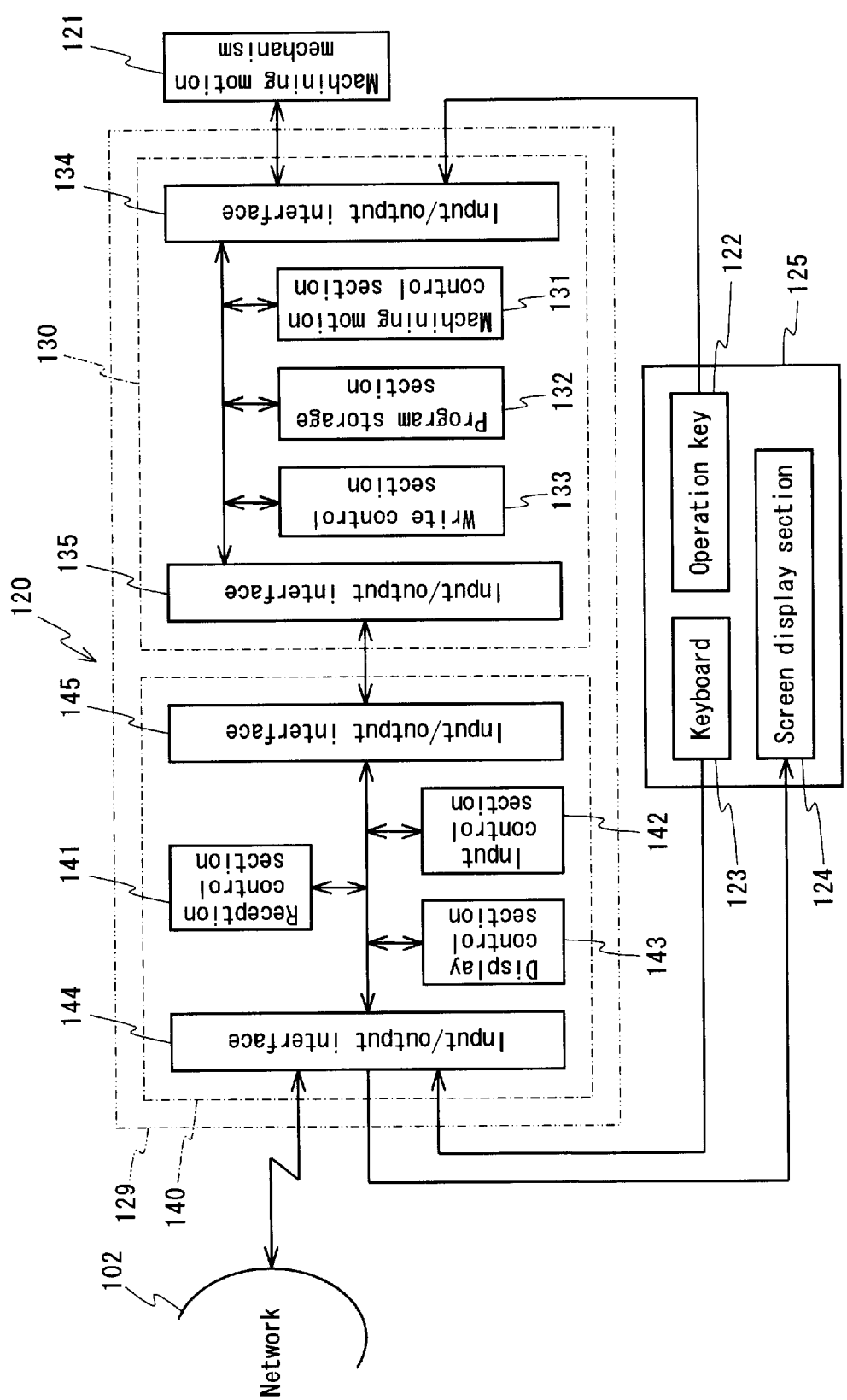
FIG. 7 is a block diagram illustrating an outline configuration of a control device in accordance with another embodiment.

FIG. 5 is a block diagram illustrating an outline configuration of a machining program transmission system in accordance with another embodiment of the present invention. FIG. 6 is a block diagram illustrating an outline configuration of a programming device in accordance with the present embodiment, and FIG. 7 is a block diagram illustrating an outline configuration of a control device in accordance with the present embodiment.

As shown in FIG. 5, a machining program transmission system 100 of the present embodiment is configured so that a programming device 110 for generating a machining program may be connected to a plurality of NC machine tools 120 arranged in the machining site via a network 102, such as LAN.

As shown in FIG. 6, said programming device 110 comprises a program generation section 111, a program storage section 112, a transmission control section 113, an input/output interface 114 which comprises a CPU, a ROM, a RAM, and an external storage device or the like, and an input/output device 115 connected to the input/output interface 114 or the like, and is connected to said network 102 via this input/output interface 114.

Said program generation section 111 generates the machining program interactively or automatically based on data concerning a product shape after machining, a shape and a material of a work piece, a type and a material of a tool, machining conditions (cutting speed or the like) or the like suitably inputted via the input/output device 115, and the generated machining program is stored in said program storage section 112.

Incidentally, a program number is set to said machining program for identification, and this program number is indicated with a cord which consists of, for example "O****" (alphabet O and four digits following thereto).

Said transmission control section 113 transmits the machining program stored in the program storage section 112 to said NC machine tool 120 via said input/output interface 114 and said network 102.

As shown in FIG. 7. said NC machine tool 120 comprises a machining motion mechanism 121 which comprises a main spindle unit, a feed mechanism or the like, an operating panel 125 which comprises an operation key 122, a keyboard 123, a screen display section 124 or the like, and a control device 129 connected to these machining motion mechanism 121 and the operating panel 125 or the like.

Said operation key 122 is a key for operating the NC machine tool 120 (for example, said machining motion mechanism 121), and said keyboard 123 is a key for inputting various data and signals. In addition, said screen display section 124 consists of an LCD or a CRT.

Said control device 129 comprises a numerical control section 130 and an input/output control section 140 which comprise a CPU, a ROM, a RAM, and an external storage device or the like, and these numerical control section 130 and input/output control section 140 are mutually connected.

Said numerical control section 130 comprises a machining motion control section 131, a program storage section 132, a write control section 133, input/output interfaces 134, 135 or the like, and said machining motion mechanism 121 and said operation key 122 are connected to the input/output interface 134.

Said program storage section 132 is a functional section which stores the machining program, and the machining program inputted from a suitable input device which is not shown or a reception control section 141 described hereafter is stored under the control by said write control section 133. Then, said machining motion control section 131 controls operation of said machining motion mechanism 121 based on the machining program stored in this program storage section 132.

Said input/output control section 140 comprises the reception control section 141, an input control section 142, a display control section 143, input/output interfaces 144, 145 or the like, and is connected to said network 102 via this input/output interface 144. Moreover, said keyboard 123 and said screen display section 124 are connected to the input/output interface 144. In addition, said numerical control section 130 and said input/output control section 140 are mutually connected via the input/output interface 135 and said input/output interface 145.

Said reception control section 141 receives the machining program transmitted from the transmission control section 113 of said programming device 110 via said network 102 and said input/output interface 144, transfers the received machining program to said numerical control section 130, and also transmits a reception start signal to the input control section 142 and the display control section 143, respectively, and when a reception of the machining program is completed, transmits a reception completion signal to the input control section 142 and the display control section 143.

Moreover, the reception control section 141 extracts a program number from the received machining program, and transmits the extracted program number to the display control section 143. Incidentally, the program number can be extracted by searching a cord (for example, code containing above "O") concerning the program number in the machining program.

Said display control section 143 is a functional section which controls a screen display of the screen display section 124 of said operating panel 125. For example, it receives data and a signal which are transmitted from the input control section 142 to display an image (for example, a program number "O****" inputted at the time of the call of the machining program, or a program code inputted on the occasion of MDI operation) according to the received data and signal, or receives information, such as an operating state of the machining motion mechanism 121 (for example, the main spindle rotating speed of said main spindle unit, the current position of the feed mechanism or the like), and the machining program under execution from said numerical control section 130 to display the same.

In addition, the display control section 143 receives a reception start signal transmitted from the reception control section 141, and displays an image for indicating that the machining program is under reception. Incidentally, this image display can be performed, for example, by blinking portions C (two points) shown with slanting lines, or displaying the message image for indicating that it is under reception or the like as shown in FIG. 8.

Figure 9:
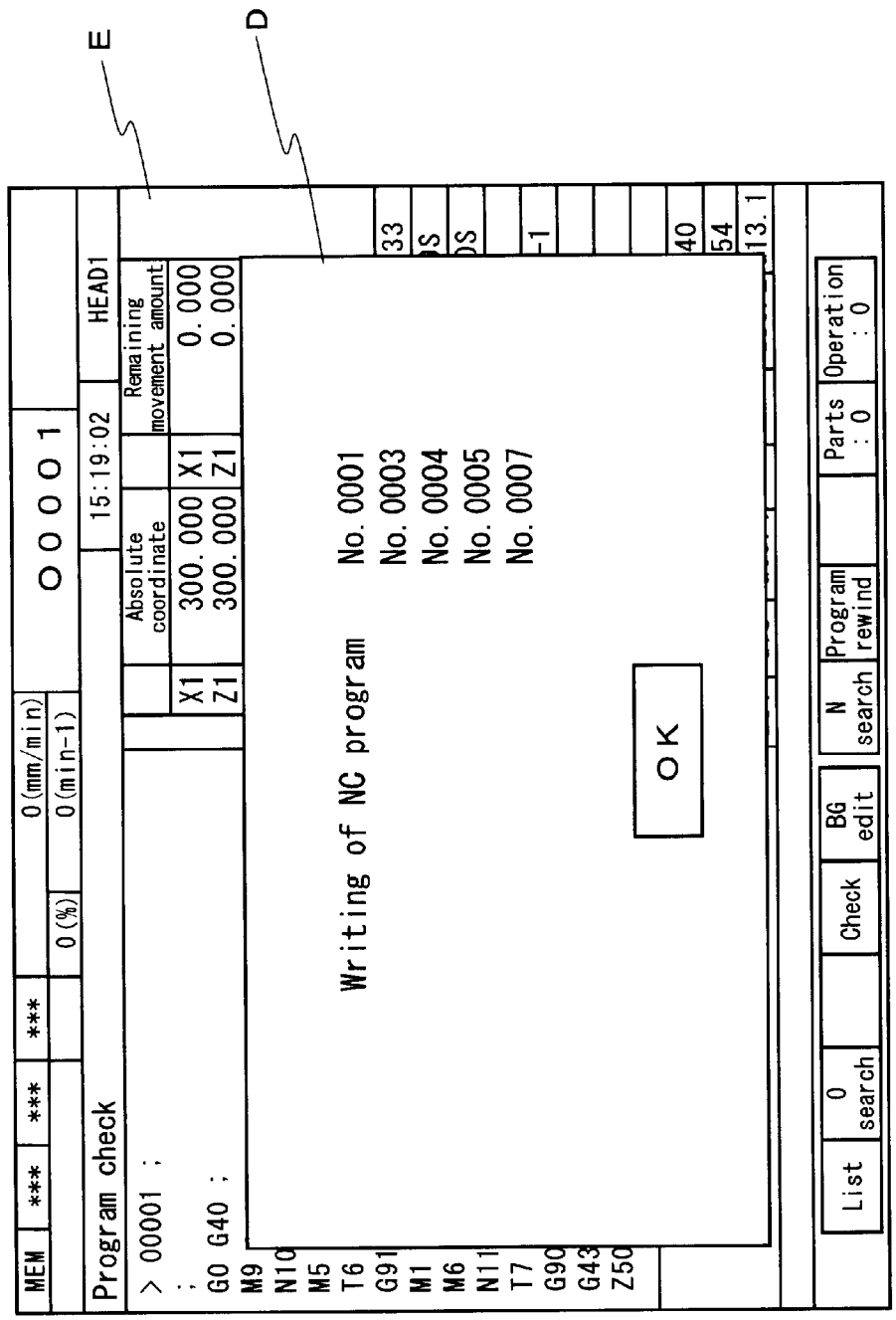

In addition, when the program number transmitted from the reception control section 141 is received, the display control section 143 displays an image concerning the received program number on the screen display section 124. The image of this program number is displayed so as to cover a part of the image already displayed on the screen display section 124 (for example, the display image, such as an operating state of the machining motion mechanism 121 and the machining program under execution), that is, to overlap the existing display image. A display screen as one example is illustrated in FIG. 9. In FIG. 9, D portion is the image of the program number and E portion is the existing displayed image.

Incidentally, the image of said program number has a configuration for urging to input a confirmation signal for obtaining a confirmation that the operator of the NC machine tool 120 has recognized the program number from said keyboard 123 or the like, and the display control section 143 deletes the image of the program number after receiving the confirmation signal in a above-mentioned manner to describe hereafter. Moreover, it receives a reception completion signal from said reception control section 141, and deletes an image that indicates that it is under reception.

Said input control section 142 receives the data and the signal which are inputted from the keyboard 123 via the input/output interface 144, transmits the received data and signal to said display control section 143 and said numerical control section 130 via the input/output interfaces 145, 135, and when the confirmation signal is inputted from the operator as described above, also transmits the confirmation signal to said display control section 143.

Moreover, when receiving the reception start signal transmitted from said reception control section 141, the input control section 142 performs a process which makes a signal inputted from the keyboard 123 invalid, that is, a process which stops transferring the input signal to the display control section 143 and the numerical control section 130. On the other hand, when receiving the reception completion signal from said reception control section 141 and receiving the confirmation signal described above, it performs a process which releases said invalid process and makes a signal inputted from the keyboard 123 valid, that is, a process which resumes transferring the input signal to the display control section 143 and the numerical control section 130 is performed.

According to the machining program transmission system 100 in accordance with the present embodiment configured as mentioned above, the machining program is transmitted to the reception control section 141 of the NC machine tool 120 from the programming device 110 via the network 102, and when this is received by the reception control section 141, the reception start signal is transmitted to the input control section 142 and the display control section 143, respectively, the received machining program is transferred to the write control section 133 of the numerical control device 130, and the program number is also extracted from the received machining program, then the extracted program number is transmitted to the display control section 143.

Then, the image for indicating that the machining program is under reception is displayed on the screen display section 124 when the reception start signal is received by the display control section 143, and furthermore, when the program number is received by the display control section 143, the image concerning the program number is displayed to overlap the existing display image on the screen display section 124.

On the other hand, the input control section 142 receives the reception start signal from the reception control section 141, and performs a process which makes a signal inputted from the keyboard 123 invalid, in said write control section 133, a process which stores the received machining program in the program storage section 132 is performed.

Then, in said reception control section 141, when the reception of the machining program is completed, the reception completion signal is transmitted to the input control section 142 and the display control section 143, respectively, and the display control section 134 deletes the image for indicating that it is under reception displayed on the screen display section 124.

In addition, when the confirmation signal for indicating that the program number displayed on the screen display section 124 has been confirmed is inputted by the operator, the display control section 134 deletes the image of the program number displayed on the screen display section 124, and the input control section 142 releases said invalid process and performs a process which makes a signal inputted from the keyboard 123 valid after receiving the reception completion signal from the reception control section 141 and receiving said confirmation signal.

Thus, according to this machining program transmission system 100, since the program number is automatically displayed on the screen display section 124 of the operating panel 125 frequently looked at while the operator operates the NC machine tool 120, the operator can be made to recognize certainly the machining program stored in the program storage section 132. Thereby, the operator can grasp accurately what kind of machining program is stored in the program storage section 132.

In addition, since it is configured so that the image of the program number may be displayed to overlap the image already displayed on the screen display section 124, it is easy for the operator to confirm the displayed program number, and that makes it possible to make the operator recognize with more certainty the machining program stored in the program storage section 132.

Moreover, by displaying to overlap the existing display images, it becomes impossible for the operator to recognize the images having been displayed till then, and it becomes impossible for the operator to perform the operation while looking at the screen display until the display image of the program number disappears. Furthermore, since the signal inputted from said keyboard 123 is made invalid until the confirmation signal is inputted into the input control section 142 and the reception completion signal is inputted from the reception control section 141 after displaying the image concerning the program number on the screen display section 124, the operator cannot edit the machining program while the transmission process is being performed.

Thereby, for example, that makes it possible to prevent beforehand such a situation where the operator calls the machining program changed by the transmission process to perform continuous machining using the machining program which has not completed trial machining yet, while not fully grasping the addition and the change of the machining program from reaching thereto.

Moreover, since it is configured so that the program number may be continuously displayed until the confirmation signal is inputted by the operator, the operator can be made to recognize with more certainty the machining program stored in the program storage section 132.

By the way, although the period of time for the control device 129 to receive the machining program is relatively short, it may still happen that the operator performs the editing operation on the existing machining program stored in the program storage section 132 during the reception. For this reason, when the existing machining program is replaced with the machining program which has been modified therefrom by the transmission process, a situation where the machining program which must have been replaced is further replaced with the machining program which the operator has edited may arise, and that makes it impossible for the side which transmits the machining program (management side) to accurately manage the machining program stored in the control device 129 of each NC machine tool 120.

In the machining program transmission system 100 of the present embodiment, as described above, since it is configured so that the screen display may indicate that it is under reception while the control device 129 is receiving the machining program, the operator can be made to clearly recognize that it is under reception, and it can prevent the occurrence of the problem mentioned above.

Incidentally, in this embodiment, although it is configured so that the signal inputted from the keyboard 123 may be made invalid while the machining program is being received, but it is not limited to this, it may also be configured so that an input signal from the operation key 122 may be made invalid, a signal inputted from input means different from this may be made invalid, or an input signal from all or a suitable combination of the input means may be made invalid.

Moreover, although it is configured so that the image concerning the program number may be displayed to cover a part of the existing display image, it may also be configured so that the whole existing display image may be hidden, that is, it may be displayed on the full screen.

Figure 10:
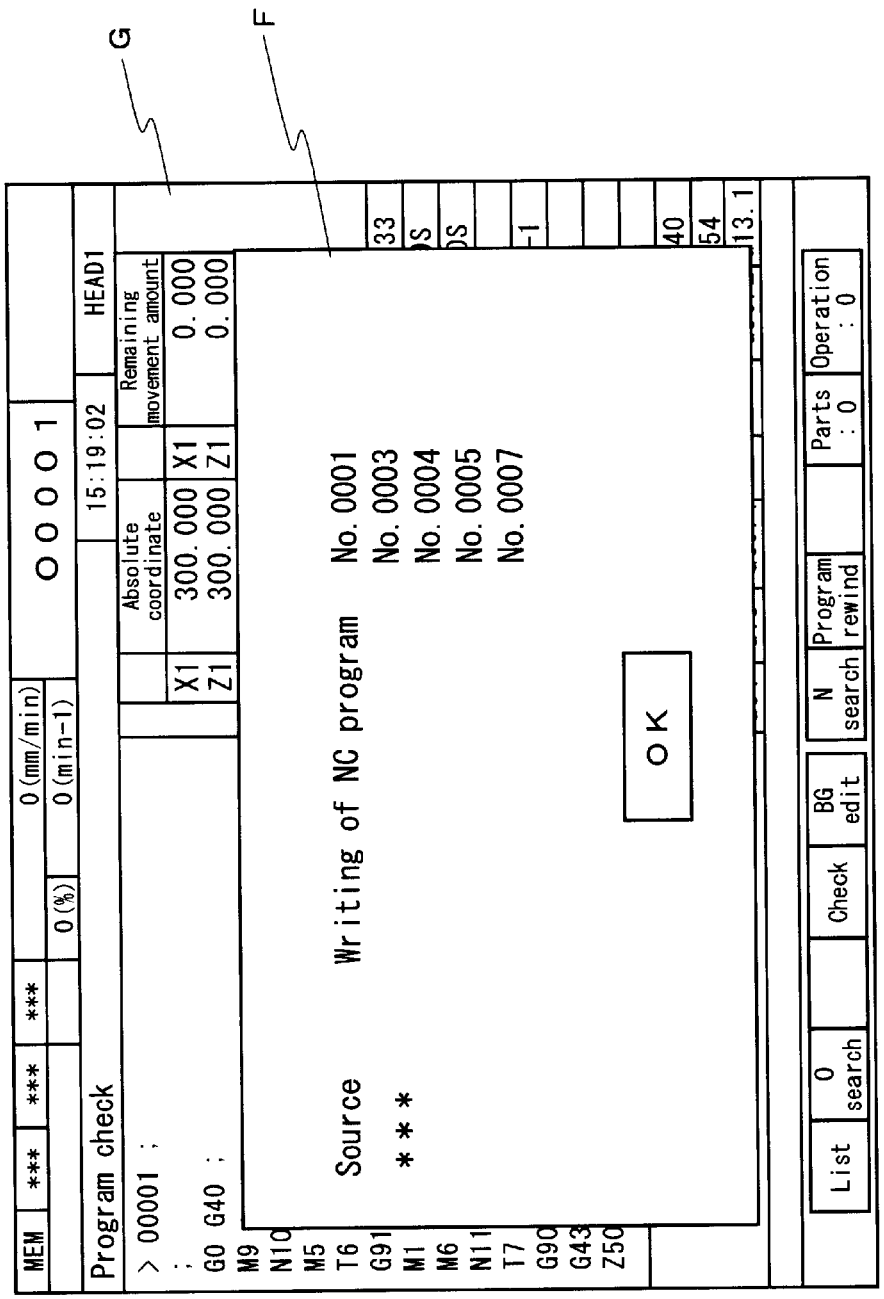
FIG. 10 is an explanatory drawing illustrating one example of a screen displayed on a screen display section in accordance with further another embodiment of the present invention.

In addition, although one programming device 110 and a plurality of NC machine tools 120 are connected via the network 102, not limited to this, it may be configured so that the plurality of programming devices 110 and the plurality of NC machine tools 120 may be connected via the network 102. In this case, as shown in FIG. 10, if it is configured so that the program number and the programming device name of a source may be displayed on the screen display section 124, it is convenient that the operator can recognize the machining program transmitted from which programming device 110. Incidentally, in FIG. 10, F portion is an image of the program number and the programming device name of the source, and G portion is an existing displayed image.

What is claimed is:

1. An NC machine tool
comprising a machining motion mechanism, a control device which controls operation of this machining motion mechanism, and an operating panel which includes at least input means for inputting a signal to said control device, and screen display means,
wherein said control device is configured so that it can be connected to a transmission device which transmits information via telecommunication circuits, and is also configured so as to receive said information from said transmission device, and to display the received information on said screen display means,
wherein information transmitted from said transmission device to said control device is an instructing message, and said control device is configured so that a received instructing message may be displayed on said screen display means.

2. The NC machine tool according to claim 1,
wherein said input means is configured so that it can input a confirmation signal, and
wherein said control device is also configured, after displaying said instructing message on said screen display means, so as to continue the display until receiving the confirmation signal inputted from said input means, and after receiving the confirmation signal, to complete the display of said instructing message.

3. The NC machine tool according to claim 2, wherein said control device is configured, after displaying said instructing message on said screen display means, so as to make all or a part of other signals inputted from said input means invalid until receiving the confirmation signal inputted from said input means.

4. The NC machine tool according to claim 1, wherein said control device is configured so as to display said instructing message to cover all or a part of the image already displayed on said screen display means.

5. The NC machine tool according to claim 4,
wherein said input means is configured so that it can input a confirmation signal, and
wherein said control device is also configured, after displaying said instructing message on said screen display means, so as to continue the display until receiving the confirmation signal inputted from said input means, and after receiving the confirmation signal, to complete the display of said instructing message.

6. The NC machine tool according to claim 5, wherein said control device is configured, after displaying said instructing message on said screen display means, so as to make all or a part of other signals inputted from said input means invalid until receiving the confirmation signal inputted from said input means.

7. An NC machine tool comprising a machining motion mechanism, a control device which controls operation of this machining motion mechanism, and an operating panel which includes at least input means for inputting a signal to said control device, and screen display means,
wherein said control device is configured so that it can be connected to a transmission device which transmits information via telecommunication circuits, and is also configured so as to receive said information from said transmission device, and to display the received information on said screen display means,
wherein the information transmitted from said transmission device to said control device is a machining program, and wherein said control device is configured so as to store a received machining program, also to extract a program number from this machining program, and to display an extracted program number on said screen display means.

8. The NC machine tool according to claim 7,
wherein said input means is configured so that it can input a confirmation signal, and
wherein said control device is also configured, after displaying said program number on said screen display means, so as to continue the display until receiving the confirmation signal inputted from said input means, and after receiving the confirmation signal, to complete the display of said program number.

9. The NC machine tool according to claim 8, wherein said control device is configured, after displaying said program number on said screen display means, so as to make all or a part of other signals inputted from said input means invalid until receiving the confirmation signal inputted from said input means and completing a reception of the program.

10. The NC machine tool according to claim 7, wherein said control device is configured so as to display said program number to cover all or a part of the image already displayed on said screen display means.

11. The NC machine tool according to claim 10,
wherein said input means is configured so that it can input a confirmation signal, and
wherein said control device is also configured, after displaying said program number on said screen display means, so as to continue the display until receiving the confirmation signal inputted from said input means, and after receiving the confirmation signal, to complete the display of said program number.

12. The NC machine tool according to claim 11, wherein said control device is configured, after displaying said program number on said screen display means, so as to make all or a part of other signals inputted from said input means invalid until receiving the confirmation signal inputted from said input means and completing a reception of the program.

13. The NC machine tool according to claim 7, wherein said control device is configured so that image for indicating that the machining program is under reception is displayed on said screen display means while receiving said machining program.

14. An information transmission system wherein the NC machine tool according to any one of claims 1 to 13 is connected to a transmission device which transmits information via telecommunication circuits.

* * * * *